United States Patent [19]

Marwah et al.

[11] Patent Number: 4,554,771
[45] Date of Patent: Nov. 26, 1985

[54] FIELD-ASSEMBLED CELLULAR DECKING UNIT

[75] Inventors: Ashok K. Marwah, Pittsburgh; Charles H. Norris, Jr., Wexford, both of Pa.

[73] Assignee: H. H. Robertson Company, Pittsburgh, Pa.

[21] Appl. No.: 626,887

[22] Filed: Jul. 2, 1984

[51] Int. Cl.[4] .......................... H02G 3/28; E04B 5/48
[52] U.S. Cl. .......................................... 52/221; 174/48
[58] Field of Search .................... 52/221, 173 R, 576, 52/577; 174/48, 57

[56] References Cited

U.S. PATENT DOCUMENTS

| | | |
|---|---|---|
| 2,026,278 | 12/1935 | Higley . |
| 2,837,008 | 2/1959 | Ashman . |
| 2,899,028 | 8/1959 | Walker . |
| 3,459,875 | 8/1969 | Fork ........................ 174/97 |
| 3,721,051 | 3/1973 | Fork ....................... 52/221 X |
| 3,751,576 | 8/1973 | Klinkman et al. ............ 174/48 |
| 3,973,366 | 8/1976 | Balane et al. .............. 52/99 |
| 4,178,469 | 12/1979 | Fork ...................... 52/221 X |
| 4,338,484 | 7/1982 | Littrell ..................... 174/48 |
| 4,454,692 | 6/1984 | Ault ....................... 52/221 |

Primary Examiner—J. Karl Bell
Attorney, Agent, or Firm—George E. Manias

[57] ABSTRACT

A cellular decking unit, for field-assembly or factory-assembly, useful in the construction of a wire distributing floor structure. The cellular decking unit is assembled from upper and lower metal sheets arranged so as to provide laterally open channels. The channels are adapted to receive and to be closed by side portions of the adjacent fluted decking units thereby to form lateral enclosed raceways.

11 Claims, 5 Drawing Figures

U.S. Patent  Nov. 26, 1985  Sheet 1 of 2  4,554,771
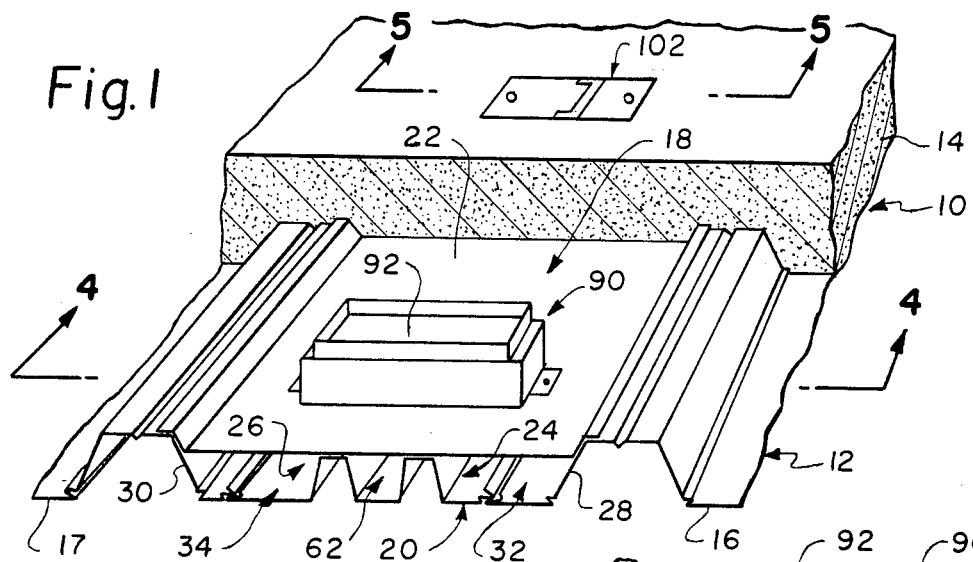
Fig. 1
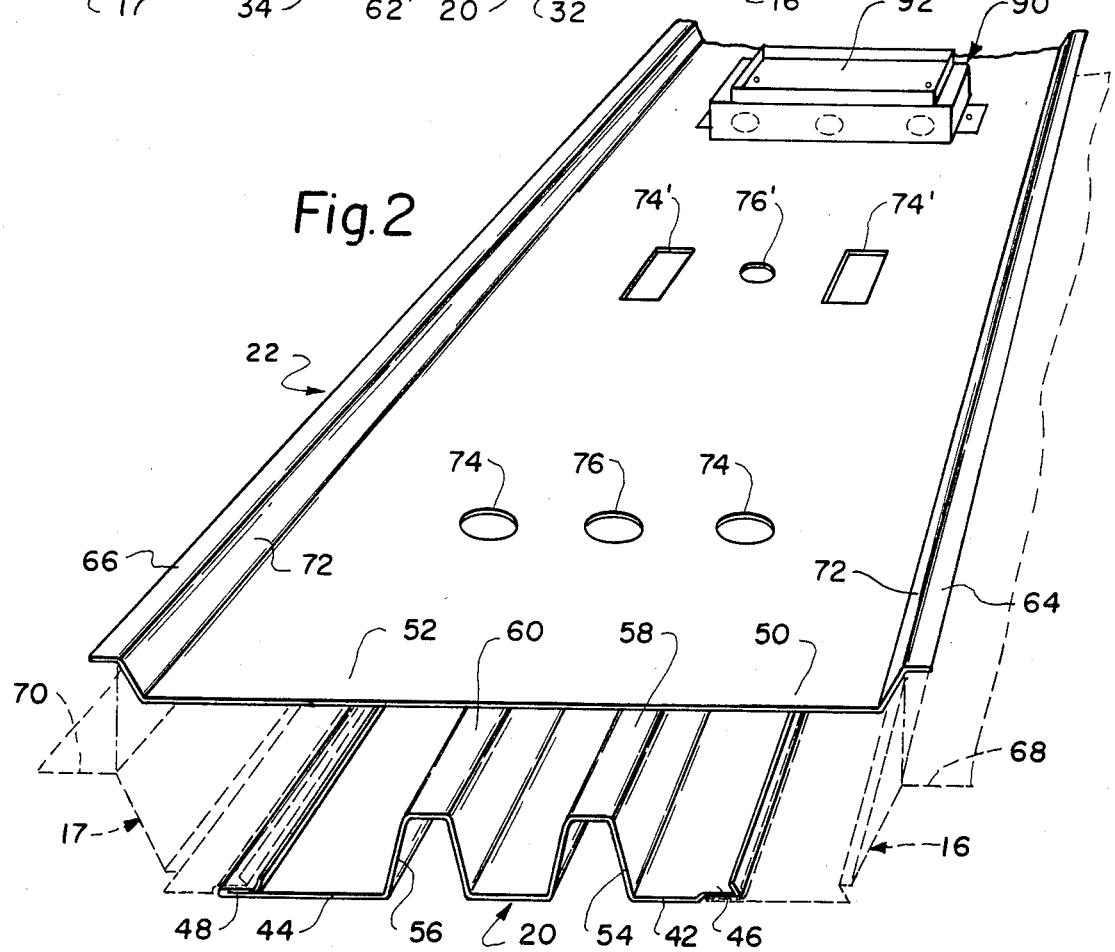
Fig. 2
Fig. 3

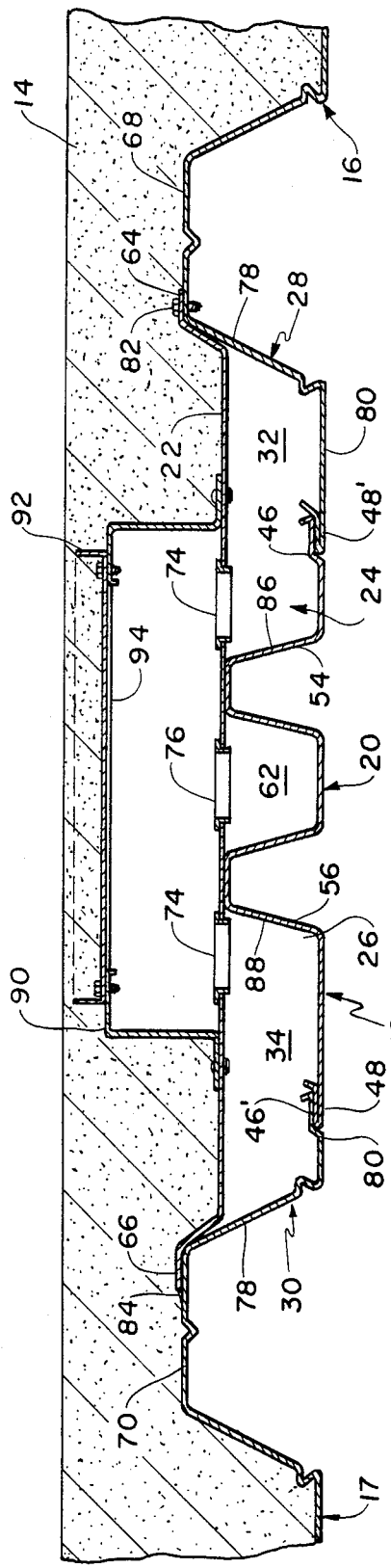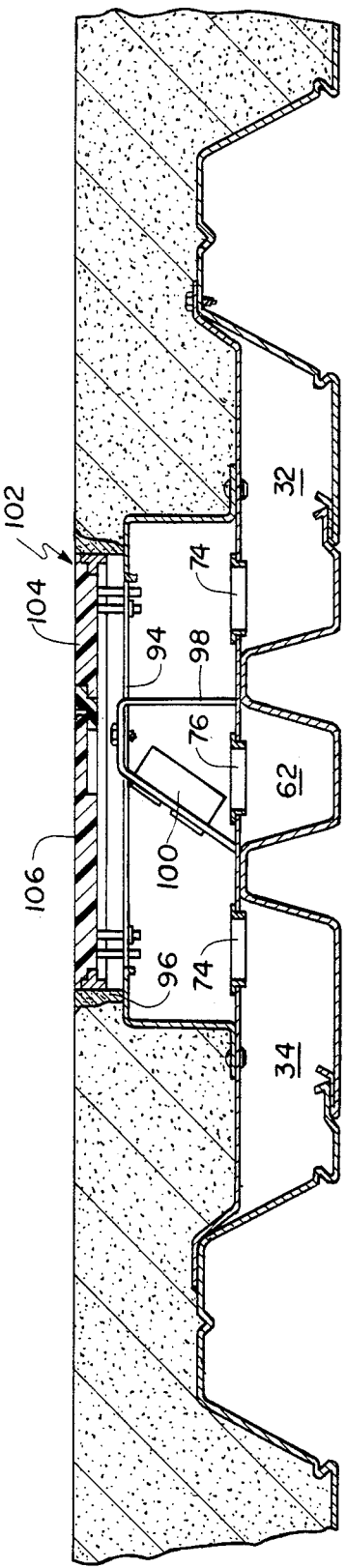

FIELD-ASSEMBLED CELLULAR DECKING UNIT

BACKGROUND OF THE INVENTION

1. Field of the Invention

This invention relates generally to flooring units useful for distributing the wiring of various electrical services, such as, power, telephone and communication wiring throughout the floor of single story and multi-story buildings; and more particularly, to a field-assembled cellular decking unit providing plural, generally parallel, enclosed cells.

2. Description of the Prior Art

Cellular decking units are known which provide in-floor raceways for distributing electrical services, such as, power, telephone and CRT services. Such a unit is disclosed in U.S. Pat. No. 3,459,875 (FORK) wherein three enclosed cells separated by lengthwise troughs are provided. Conduit means connecting a first set of adjacent cells and outlet openings formed in a second set of adjacent cells provide access to all three electrical services at a single location in the flooring unit.

Another type of decking unit is known wherein an elongated upper metal sheet, having an inverted hat-shaped profile, is secured to a generally flat, corelative lower metal sheet along contiguous portions thereof. The lower metal sheet presents at least one partition, formed by a re-entrant bend in the lower metal sheet, which projects upwardly therefrom into engagement with the upper metal sheet and which extends along the entire length of the lower metal sheet. That is, a relatively wide single cell decking unit is divided into separate, adjacent subcells by one or more partitions integrally formed in the lower metal sheet. Such a decking unit, commonly known as a plural-cell duct, finds utility in reinforced concrete floor structures wherein the unit is not intended to serve as a structural component of the floor structure. Examples of such plural-cell ducts are disclosed in U.S. Pat. Nos. 3,751,576 (KLINKMAN et al) and 4,338,484 (LITTRELL).

Heretofore, cellular decking units have been factory-assembled for ready installation in the field. Known cellular decking units, as manufactured in their finished form, consist of at least two formed metal sheets welded together. Factory-assembled cellular decking units require extensive handling and production in the factory. Additionally, since factory-assembled cellular decking units do not nest readily with one another, higher shipping and handling costs are incurred in transporting the units from the factory to the field. Another disadvantage of presently known configuration of factory-assembled cellular decking units is that the amount of metal used to construct the unit exceeds that amount needed to support floor live loads.

Panel units are known which are adapted for field-assembly to form roofs, walls and floors. Such panel units may have a generally z-shaped or S-shaped configuration wherein a first half of a first panel unit overlies the second half of an adjacent second panel unit, and a second half of the first panel unit underlies the first half of an adjacent third panel unit. See for example U.S. Pat. Nos. 2,026,278 (HIGLEY) and 2,899,028 (WALKER). Another such panel unit presents a corrugated lower section having a flat wing-like upper section extending laterally therefrom. When assembled, the upper section of each unit caps the corrugated lower section of the adjacent unit to provide a cellular construction. See for example U.S. Pat. No. 2,873,008 (ASHMAN).

The HIGLEY and ASHMAN constructions present a relatively flat upper surface which cannot coact compositely with an overlying layer of concrete and do not appear to be readily adaptable for the distribution of electrical wiring. One WALKER construction produces a subfloor/concrete structure which can be used to distribute electrical wiring. However, the use of preset access housings for accessing the wiring, requires a thicker-than-normal concrete cover.

SUMMARY OF THE INVENTION

The principle object of this invention is to provide a metal cellular decking unit adapted to distribute multiple electrical services along the length thereof and which is capable of being field-assembled.

Another object of this invention is to provide a metal cellular decking unit presenting at least two laterally open channels, wherein each of the channels is converted into a field-formed lateral cell by the cooperative action of upper and lower elements of the decking unit and a side portion of an adjacent decking unit.

Still another object of this invention is to provide a cellular decking unit which utilizes less metal in its construction than do known cellular decking units.

The present invention relates to a cellular decking unit comprising lower and upper metal sheets. The lower metal sheet has at least one upwardly projecting rib and outwardly extending lower sheet portions terminating in marginal connectors which adapt the lower metal sheet for installation in side-by-side overlapped relation with adjacent fluted decking units. The upper metal sheet engages the rib and has upper sheet portions cooperating with the rib and with the lower sheet portions to define laterally open channels. Each of the channels is adapted to receive and be closed by a side portion of an adjacent decking unit to define an enclosed raceway. Thus each of the enclosed raceways is field-formed by the cooperative action of the upper metal sheet, the lower metal sheet and the adjacent decking unit.

The present cellular decking unit can be assembled in the factory or in the field. Field assembly is accomplished by welding or otherwise fastening the lower metal sheet to the structural steel and to the adjacent decking units. The upper metal sheet then is placed in position and is infrequently secured to the top surfaces of the adjacent decking units. Field-assembly permits a reducting in handling and production costs in the factory and, additionally permits a reduction in shipping costs since each of the elements of the decking unit can be nested with like elements for shipping compaction.

The use of side portions of the adjacent decking units to form the sides of the thus-produced lateral raceways reduces the amount of metal used in the decking unit. This reduction in metal quantity, however, does not necessarily impair the load-carrying capacity of the finished assembly. In addition, the lateral raceways may be modified to provide substantially any desired wire carrying capacity solely by increasing or decreasing the width of the upper and lower channels.

Other objects and advantages of the present invention will become apparent from the following detailed description of the presently preferred embodiments taken together with the accompanying drawing.

BRIEF DESCRIPTION OF THE DRAWINGS

FIG. 1 is a fragmentary perspective view of a wire distributing floor structure incorporating the cellular decking unit of this invention;

FIG. 2 is a fragmentary perspective view illustrating the components of the present cellular decking unit;

FIG. 3 is an end view of an alternative cellular decking unit of this invention;

FIG. 4 is a fragmentary cross-sectional view taken along the line 4—4 of FIG. 1 but with the covering layer of concrete added for illustration; and FIG. 5 is a fragmentary cross-sectional view taken along the line 5—5 of FIG. 1.

DESCRIPTION OF THE PREFERRED EMBODIMENTS

FIG. 1 illustrates a wire distributing floor structure 10 of the type including a metal subfloor 12 supporting an overlying layer of concrete 14. The metal subfloor 12 is assembled from at least two fluted decking units 16, 17 which are separated by the cellular decking unit 18 of this invention. It will be appreciated that, if desired, cellular decking units could be substituted for either or both of the fluted decking units 16, 17. As will become apparent a cellular decking unit cooperates in the same manner as a fluted decking unit in forming a lateral cell.

In general, the present cellular decking unit 18 comprises lower and upper metal sheets 20, 22 which are configured so that when assembled, laterally open channels 24, 26 are formed. Each of the channels 24, 26 is adapted to receive and be closed by a side portion 28, 30 of the adjacent fluted decking unit 16, 17, respectively, and thus form enclosed raceways 32, 34 for distributing the electrical wiring of various electrical services.

In one preferred form of the invention, as shown in FIG. 3, the lower sheet 20 has at least one upwardly projecting rib 36 presenting opposite rib faces 38, 40 connected at their upper ends by a rib top wall 41, and lower sheet portions 42, 44 extending outwardly from the rib faces 38, 40 and terminating in marginal connectors 46, 48 respectively. The upper metal sheet 22 engages the rib top wall 41 and has upper sheet portions 50, 52 extending outwardly from the rib 36. The upper sheet portion 50 cooperates with the rib face 38 and the lower sheet portion 42 to define the aforesaid laterally open channel 24. Similarly, the upper sheet portion 52 cooperates with the rib face 40 and the lower sheet portion 41 to define the aforesaid laterally open channel 26.

In another preferrred form of the invention shown in FIG. 2, the lower sheet 20 may present two or more spaced-apart upwardly projecting ribs 54, 56 having rib top walls 58, 60, respectively. When the upper metal sheet 22 engages the rib top walls 58, 60, an enclosed central raceway 62 (FIG. 4) is formed as are the laterally opened channels 24, 26.

As shown in FIGS. 2 and 3, the upper metal sheet 22 is wider than the lower metal sheet 20. That is, the upper sheet portions 50, 52 extend outwardly beyond the marginal connectors 46, 48 for overlapping the adjacent decking units. The upper metal sheet 22 also may comprise a pan-shaped element including lateral flanges 64, 66 adapted to overlap the crest 68, 70 of the adjacent fluted decking units 16, 17; and a central web including the upper sheet portions 50, 52; and side walls 72 connecting each of the flanges 64, 66 to the central web. The central web resides at a level below that of the lateral flanges 64, 65 and is engaged with the rib 36 or the ribs 54, 56.

Referring to FIG. 2, the upper metal sheet 22 may present a set of access openings 74 each communicating with one of the laterally open channels 24, 26. The access openings 74 may take the circular shape or a generally rectangular shape as shown at 74'. Where two upwardly projecting ribs 54, 56 are provided (FIG. 2) the upper metal sheet 22 may present an access opening 76 of circular configuration or an access opening 76' of generally rectangular configuration for access to the central raceway 62.

As best shown in FIG. 4, the side portion 28 of the fluted decking unit 16 comprises an inclined web 78 connecting the crest 68 to a valley 80. The valley 80 terminates in a marginal connector 48' which is complimentary to the marginal connector 46 of the cellular decking unit 18. Similarly, the side portion 30 of the fluted decking units 17 comprises the incline web 78 connecting the crests 70 to the valley 80. The valley 80 is provided with a marginal connector 46' which is complimentary to the marginal connector 48 of the cellular decking unit 18. Thus the marginal connectors 46, 48 adapt the lower metal sheet 20 for installation in side-by-side overlap relation with the adjacent decking unit 16, 17. It will also be observed that the lateral flanges 64, 66 overlie the crests 68, 70 respectively. The lateral flanges 64, 66 are infrequently secured to the crests 68, 70 by any suitable means, such as, self-drilling self-tapping screws 82 or tack welds 84.

As most clearly illustrated in FIG. 4, the enclosed raceway 32 is formed in part by the laterally open channel 24 and in part by the side portion 28 of the decking unit 16. Similarly, the enclosed raceway 34 is formed in part by the laterally open channel 26 and in part by the side portion 30 of the fluted decking unit 17. It will be appreciated that the wire carrying capacity of either or both of the enclosed raceways 32, 34 may be varied by correspondingly increasing or decreasing the widths of the lower and upper metal sheets 20, 22.

Referring to FIGS. 1 and 2, a suitable preset housing 90 may be secured to the upper metal sheet 22 and covering relation with a set of the access openings 74, 76. As is conventional, the housing 90 is provided with a knock-out pan 92 secured to the top wall thereof to preclude ingress of the concrete 14 thru an outlet opening 94 (FIG. 4) provided in the top wall of the access housing 90. When the housing 56 is to be activated, the concrete above the pan 92 is broken, and the broken concrete and the pan 92 are removed. A passageway 96 (FIG. 5) is formed in the concrete 14, which establishes communication between the space above the floor structure 10 and the interior of the housing 90 thru the outlet opening 94. A carrier 98 may be inserted into and secured to the housing 92. The carrier 98 may support a duplex or triplex receptacle 100. In this arrangement, the central raceway 62 distributes electrical power wiring (not shown). The lateral raceways 32, 34 may be used to distribute telephone and communication wiring which, when needed, may extend thru the access openings 74 into the interior of the housing 92 and upwardly through the outlet opening 64. A suitable closure means, such as a floor outlet 102 is installed in covering relation with the passageway 92 and may be substantially flushed with the upper surface of the concrete 14. As illustrated in FIG. 5, the closure means 102 may include removable covers 104, 106 for gaining access to the wiring in the lateral raceways 32, 34, respectively.

We claim:

1. A cellular decking unit comprising:
   a lower metal sheet having at least one upwardly projecting rib presenting opposite rib faces, and lower sheet portions extending from said rib faces and terminating in marginal connectors; and
   an upper metal sheet engaged with said rib and having upper sheet portions cooperating with said opposite faces and said lower sheet portions to define laterally open channels, each of said channels being adapted to receive and be closed by a side portion of an adjacent decking unit to form an enclosed raceway.

2. The cellular decking unit as defined in claim 1 wherein said upper sheet portions of said upper metal sheet extend outwardly beyond said marginal connectors.

3. The cellular decking unit as defined in claim 1 wherein said upper metal sheet presents access openings, one communicating with each of said channels.

4. The cellular decking unit as defined in claim 1 wherein said upper metal sheet is pan-shaped including lateral flanges adapted to overlap the adjacent decking units, and a central web residing at a level below that of said lateral flanges and engaged with said rib.

5. The cellular decking unit as defined in claim 1 wherein said lower metal sheet presents a second upwardly projecting rib which is spaced-apart from the first said rib and cooperating therewith and with the said upper metal sheet to provide an enclosed central raceway.

6. In a wire distributing floor structure of the type including a metal subfloor assembled from at least two fluted decking units separated by a cellular decking unit, said cellular decking unit comprising:
   a lower metal sheet having at least one upwardly projecting rib presenting opposite rib faces, and a lower sheet portion extending outwardly from said rib faces and terminating in marginal connectors, each of said marginal connectors engaging a complimentary marginal connector of an adjacent one of said fluted decking units; and
   an upper metal sheet engaged with said rib and having upper sheet portions each overlapping the adjacent one of said fluted decking unit;
   each of said upper sheet portions cooperating with the adjacent one of said rib faces and the subjacent one of said lower sheet portions to define a channel which is closed by the adjacent decking unit to provide an enclosed raceway.

7. The floor structure as defined in claim 6 wherein said upper sheet portions of said upper metal sheet extend outwardly beyond said marginal connectors.

8. The floor structure as defined in claim 6 wherein said upper metal sheet presents access openings, one communicating with each of said enclosed raceways.

9. The floor structure as defined in claim 6 wherein said upper metal sheet is pan-shaped including lateral flanges overlapping crests presented by the adjacent fluted decking units, and a central web residing at a level below that of said lateral flanges and engaged with said rib.

10. The floor structure as defined in claim 6 wherein said lower metal sheet presents a second upwardly projecting rib which is spaced-apart from the first said rib and which cooperates therewith and with said upper metal sheet to provide an enclosed central raceway.

11. A cellular decking unit for cooperation with adjacent fluted decking units, said cellular decking unit comprising;
   a lower metal sheet having at least one centrally disposed, upwardly projecting, rib and having marginal connectors adapted to engage said adjacent fluted decking units; and
   a pan-shaped upper element presenting a central web which engages said rib and having lateral flanges which overlap said adjacent fluted decking units to form a cellular decking unit presenting at least two enclosed raceways, wherein said two of said enclosed raceways are defined by cooperative action of said upper metal sheet, said lower metal sheet and said adjacent fluted decking units.

* * * * *